This invention relates to a disc brake and more particularly to a disc brake of the type wherein a housing which straddles a rotor is movable relative to a support member.

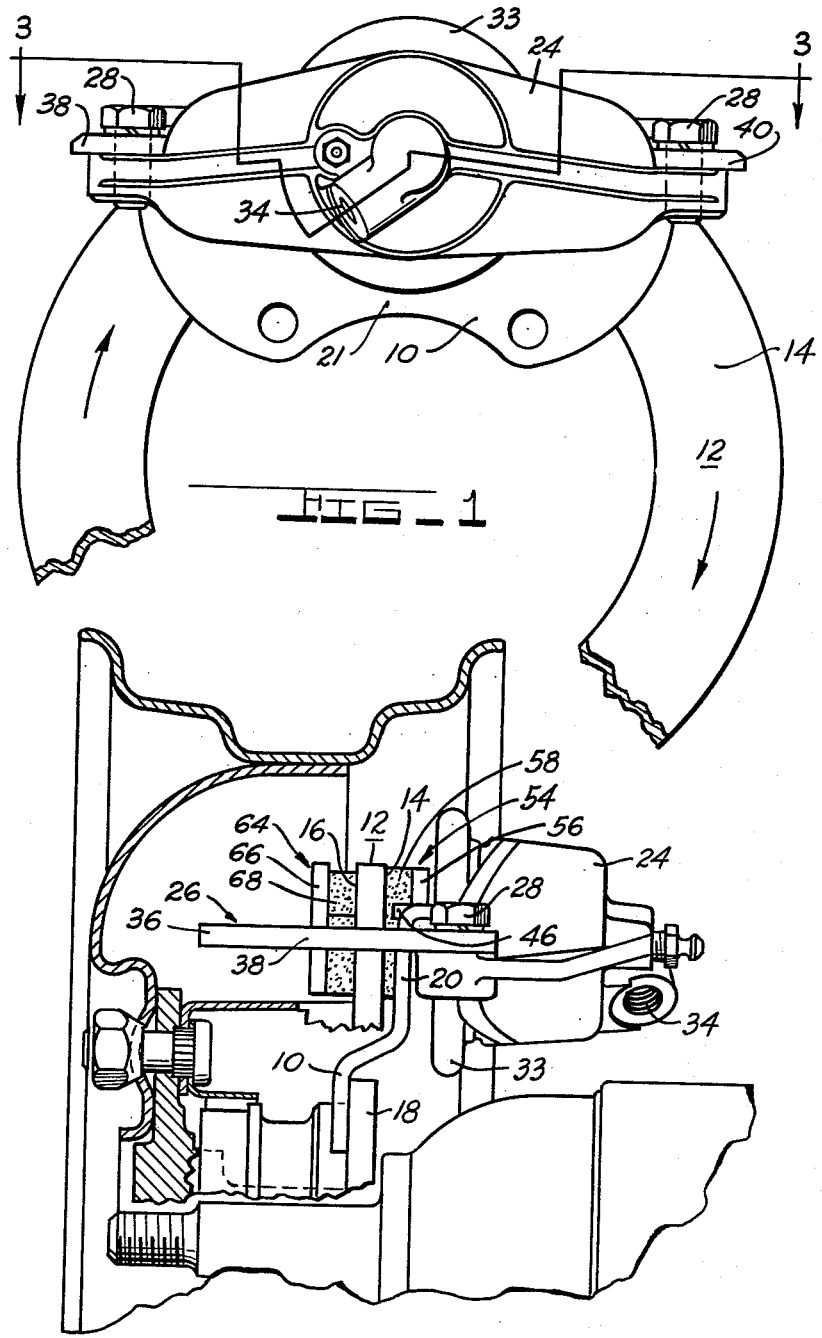

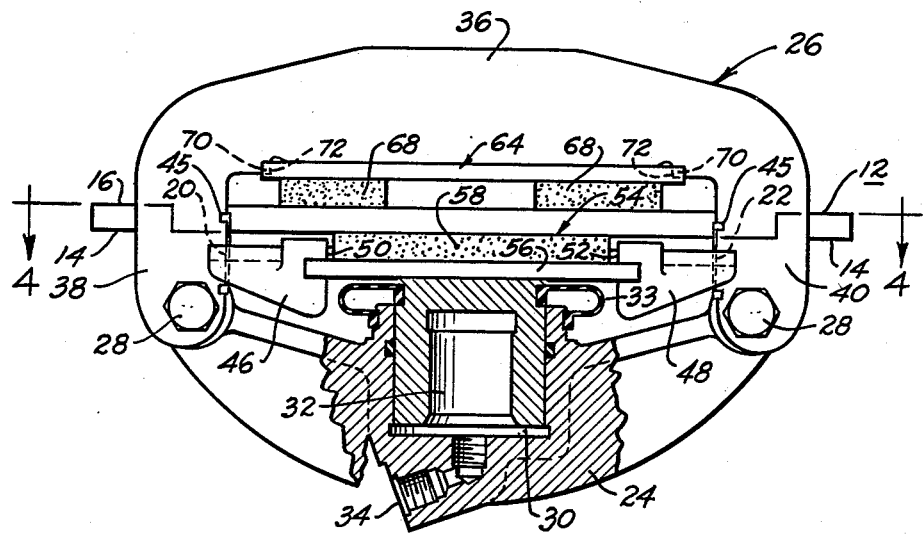
FIG_3
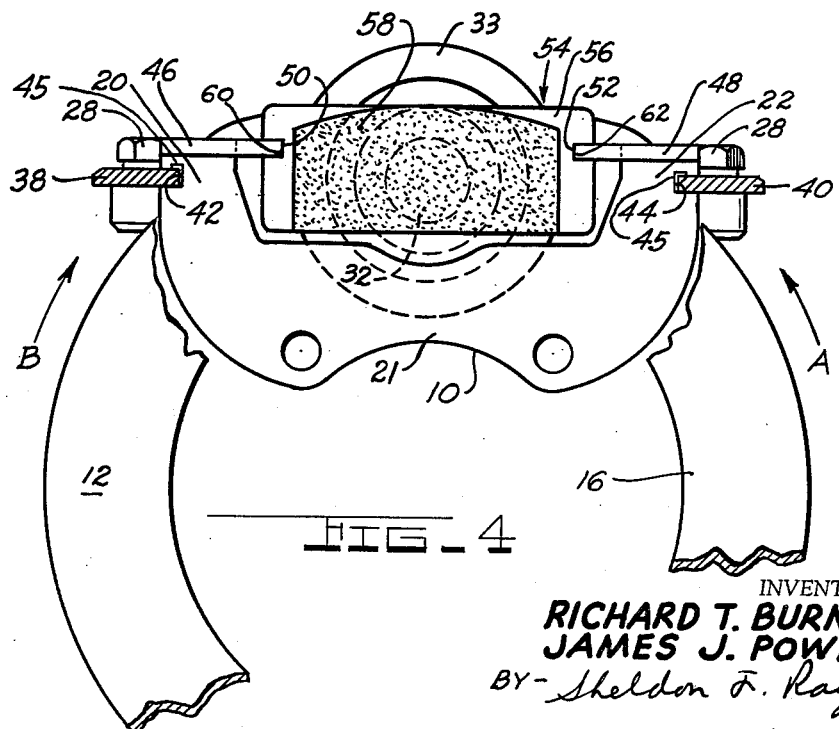
FIG_4
INVENTORS
RICHARD T. BURNETT.
JAMES J. POWLAS.
BY- Sheldon F. Razee
ATTORNEY 3,166,158
SPOT TYPE DISC BRAKE
Richard T. Burnett and James J. Powlas, South Bend, Ind., assignors to The Bendix Corporation, South Bend, Ind., a corporation of Delaware
Filed May 2, 1963, Ser. No. 277,504
3 Claims. (Cl. 188—73)

An object of this invention is to provide a disc brake wherein a housing carrying actuating means thereon is movable relative to its support member toward and away from a brake rotor, friction means located on one side of the rotor is slidably mounted on the support member and is moved into engagement with the rotor by the actuating means, and upon movement of the housing relative to the support member the housing brings friction means carried thereby and located on the other side of the motor into engagement with the rotor.

Another object of the invention is to provide a disc brake wherein friction means located on one side of the rotor of a brake rotor transfers torque through a housing carrying the same to a support member carrying the housing and friction means located on the other side of the brake rotor transfers torque directly to the support member.

Other objects and advantages will become apparent to those skilled in the art from the following description with reference to the drawings wherein:

FIG. 1 is a front elevational view of a brake assembly;
FIG. 2 is a side view of the brake of FIG. 1;
FIG. 3 is a view taken along section line 3—3 of FIG. 1; and
FIG. 4 is a view taken along section line 4—4 of FIG. 3.

Referring to the drawings, there is illustrated a support bracket 10 extending along one side of a rotor 12 having annular opposed friction surfaces 14 and 16 thereon. The support bracket 10 is mounted on a fixed part of a vehicle such as an axle flange 18 and has a pair of circumferentially spaced arms 20 and 22 extending from a main base portion 21. A housing is slidably mounted on the support bracket for movement in an axial direction and comprises a cylinder casting 24 and a U-shaped flat rib 26 which is attached to the cylinder casting by bolts 28. The cylinder casting 24 comprises a fluid chamber 30, having a piston 32 slidable therein, and an inlet port 34 communicating with the fluid chamber 30. A boot 33 seals the fluid chamber from outside contaminates. The flat rib 26 has a portion 36 extending chordally of and located opposite the friction surface 16 of the rotor and a pair of legs 38 and 40 extending axially therefrom across the periphery of the rotor 12. The arms 20 and 22 of the support bracket 10 have a pair of slots 42 and 44, respectively, slidably receiving the legs 38 and 40 of the rib 26. Thus the housing is slidably mounted to the support bracket for axial movement relative to the support member. A leaf spring 45 is inserted between the edge of the slot 42 and 44 and the legs 38 and 40 of the housing to prevent rattling of the housing on the bracket.

Flanges 46 and 48 are bent away from the arms 20 and 22, respectively, and extend in a direction transverse to the plane of the rotor friction surfaces 14 and 16 and provide thereon guiding and anchoring surfaces for a friction member 54 at their respective inner edges 50 and 52. The friction member 54 comprises a backing plate 56 with friction material 58 attached thereto. A pair of slots 60 and 62 are located on the backing plate and are slidably received on the inner ends 50 and 52 of the flanges 46 and 48, respectively, for sliding movement of the friction member 54 toward and away from the rotor 12. A friction member 64 comprising a backing plate 66 and a pair of friction linings 68 attached thereto is located opposite the rotor friction surface 16 and is fixedly attached to the flat rib 26 by a slot 70 and tab 72 connection for movement with the housing toward and away from its respective rotor friction surface 16.

Operation

In operation and assuming rotation of the rotor 12 in the direction of the arrow A, fluid pressure is applied to the chamber 30 actuating the piston 32. The piston 32 will engage the brake shoe 54 sliding the same on its guiding surfaces 50 and 52 into engagement with the friction surface 14. Pressure reaction will cause sliding of the housing in the slots 42 and 44 of the support arms 20 and 22 to bring the brake shoe 64 into engagement with its respective rotor friction surface 16. The torque exerted on the friction member 54 by the rotor 12 will cause the friction member 54 to anchor on the inner surface 50 of the flange 46 while the torque exerted on the friction member 64 by the rotor 12 will be transferred through the flat rib 26 of the housing to the arm 22 of the support bracket by anchoring of the leg 40 in the slot 44 of the arm 22.

Assuming rotation of the rotor in the direction of the arrow B, the torque exerted on the brake shoe 54 by the rotor 12 will cause anchoring of the friction member 54 on the inner edge 52 of the flange 48 and the torque exerted on the friction member 64 by the rotor 12 will be transferred through the rib 26 of the housing to the arm 20 of the support bracket by anchoring of the leg 38 in the slot 42 of the arm 20.

Thus it can be seen that torque exerted on each friction member may be transferred to separate arms of the support member distributing the load to each arm of the support member regardless of the direction of the rotation of the rotor.

Although this invention has been illustrated and described in connection with a specific embodiment, numerous other adaptations of the invention will become apparent to those skilled in the art. I intend to include in the scope of the following claims all equivalent applications of the invention whereby the same or substantially the same results will be obtained.

I claim:

1. A brake comprising: a rotor having a pair of friction surfaces thereon, first friction means located opposite one of said rotor friction surfaces, a fixed support member comprising a pair of circumferentially spaced arms extending opposite said one rotor friction surface and embracing said first friction means, said arms providing at their inner edges guiding and anchoring surfaces for movement of said first friction means toward and away from said rotor and for anchoring of said first friction means thereon, a housing straddling said rotor and having circumferentially spaced portions slidably connected to each of said arms for slidable movement in a direction transverse to the plane of said rotor friction surfaces, the slidable connection of said housing portions to said arms providing circumferentially spaced sets of coacting anchoring surfaces, said anchoring surfaces on said arms and on said housing being so arranged relative to each other that when the coacting anchoring surfaces of one of said circumferentially spaced sets are engaging each other there is a clearance between the coacting anchoring surfaces of the other of said circumferentially spaced sets and when the coacting surfaces of said other of said circumferentially spaced sets are engaging each other there is a clearance between the coacting anchoring surfaces of said one of said circumferentially spaced sets, second friction means located opposite the other of said rotor friction surfaces, said second friction means being connected to said housing for movement therewith, actuating means carried by said housing for effecting movement of said first friction means into engagement with said one rotor friction surface and effecting movement of said housing to bring said second friction means into engagement with its respective rotor friction surface, whereby torque exerted on said second friction means by said rotor will be transferred through said housing to one of said arms of said support member and the torque exerted on said first friction means by said rotor will be transferred directly to the other of said arms of said support member while braking during rotation of said rotor in one direction and the torque exerted on said second friction means by said rotor will be transferred through said housing to said other arm of said support member and the torque exerted on said first friction means by said rotor will be transferred directly to said one arm of said support member while braking during rotation of said rotor in the opposite direction.

2. A brake comprising: a rotor having friction surfaces thereon, a fixed support member comprising a base portion and a pair of circumferentially spaced arms extending opposite one of said rotor friction surfaces, each of said arms having an inner edge and an outer edge, a housing straddling said rotor and embracing said arms, said housing being slidably mounted to the outer edge of each of said arms for slidable movement in a direction transverse to the plane of said rotor friction surfaces, the slidable connection of said housing to said arms providing circumferentially spaced sets of coacting anchoring surfaces, said anchoring surfaces on said arms and on said housing being so arranged relative to each other that when the coacting anchoring surfaces of one of said circumferentially spaced sets are engaging each other there is a clearance between the coacting anchoring surfaces of the other of said circumferentially spaced sets and when the coacting surfaces of said other of said circumferentially spaced sets are engaging each other there is a clearance between the coacting anchoring surfaces of said one of said circumferentially spaced sets, first friction means located between said arms and slidably engaging the inner edge of said arms for movement toward and away from said rotor, second friction means located opposite the other of said rotor friction surfaces and connected to said housing for movement therewith, actuating means carried by said housing for effecting movement of said first friction means into engagement with its respective rotor friction surface and effecting movement of said housing to bring said second friction means into engagement with its respective rotor friction surface, whereby torque exerted on said second friction means by said rotor will be transferred through said housing to one of said arms of said support member and the torque exerted on said first friction means by said rotor will be transferred directly to the other of said arms of said support member while braking during rotation of said rotor in one direction and the torque exerted on said second friction means by said rotor will be transferred through said housing to said other arm of said support member and the torque exerted on said first friction means by said rotor will be transferred directly to said one arm of said support member while braking during rotation of said rotor in the opposite direction.

3. A brake comprising: a rotor having friction surfaces thereon, a fixed support plate comprising a main base portion and a pair of circumferentially spaced arms extending opposite one of said rotor friction surfaces, a flange extending from each of said arms in a direction transverse to the plane of said rotor friction surfaces, a housing straddling said rotor and embracing said arms, said housing being slidably mounted to the outer edge of each of said arms for slidable movement in a direction transverse to the plane of said rotor friction surfaces, the slidable connection of said housing to said arms providing circumferentially spaced sets of coacting anchoring surfaces, said anchoring surfaces on said arms and on said housing being so arranged relative to each other that when the coacting anchoring surfaces of one of said circumferentially spaced sets are engaging each other there is a clearance between the coacting anchoring surfaces of the other of said circumferentially spaced sets and when the coacting surfaces of said other of said circumferentially spaced sets are engaging each other there is a clearance between the coacting anchoring surfaces of said one of said circumferentially spaced sets, first friction means disposed between said flanges and slidably engaging the inner edges of said flanges for movement toward and away from said rotor, second friction means located on the other side of said rotor and connected to said housing for movement therewith, actuating means carried by said housing for effecting movement of said first friction means into engagement with its respective rotor friction surface and effecting movement of said housing to bring said second friction means into engagement with its respective rotor friction surface, whereby torque exerted on said second friction means by said rotor will be transferred through said housing to one of said arms of said support member and the torque exerted on said first friction means by said rotor will be transferred directly to the other of said arms of said support member while braking during rotation of said rotor in one direction and the torque exerted on said second friction means by said rotor will be transferred through said housing to said other arm of said support member and the torque exerted on said first friction means by said rotor will be transferred directly to said one arm of said support member while braking during rotation of said rotor in the opposite direction.

References Cited in the file of this patent
UNITED STATES PATENTS

| | | |
|---|---|---|
| 1,714,779 | Harris | May 28, 1929 |
| 2,820,530 | Chouings et al. | Jan. 21, 1958 |